United States Patent [19]

Konomura

[11] Patent Number: 5,575,754
[45] Date of Patent: Nov. 19, 1996

[54] ENDOSCOPIC APPARATUS FOR THREE DIMENSIONAL INSTRUMENTATION

[75] Inventor: Yutaka Konomura, Tokyo, Japan

[73] Assignee: Olympus Optical Co., Ltd., Tokyo, Japan

[21] Appl. No.: 412,760

[22] Filed: Mar. 29, 1995

[30] Foreign Application Priority Data

Feb. 24, 1995 [JP] Japan .................................. 7-037103

[51] Int. Cl.⁶ ..................................................... A61B 1/04
[52] U.S. Cl. .......................... 600/117; 600/114; 600/173; 356/241; 356/383
[58] Field of Search .................................. 600/114, 117, 600/118, 101, 102, 173, 111, 166; 356/241, 383, 384, 387, 17, 18, 22; 73/866.5; 348/82–85

[56] References Cited

U.S. PATENT DOCUMENTS

| 3,856,000 | 12/1974 | Chikama . | |
|---|---|---|---|
| 4,078,864 | 3/1978 | Howell . | |
| 4,191,468 | 3/1980 | Scully . | |
| 4,277,168 | 7/1981 | Oku .......................................... | 356/138 |
| 4,702,229 | 10/1987 | Zobel ...................................... | 600/114 |
| 4,737,624 | 4/1988 | Schwarte . | |
| 4,820,043 | 4/1989 | Diener . | |
| 4,895,431 | 1/1990 | Tsujiuchi et al. . | |
| 4,958,932 | 9/1990 | Kegelman et al. . | |
| 4,980,763 | 12/1990 | Lia . | |
| 5,096,292 | 3/1992 | Sakamoto et al. . | |
| 5,153,721 | 10/1992 | Eino et al. ............................... | 348/74 |

FOREIGN PATENT DOCUMENTS

| 3206337C2 | 9/1983 | Germany . |
|---|---|---|
| 3505564A1 | 10/1985 | Germany . |
| 3738667C2 | 5/1988 | Germany . |
| 62-161337 | 7/1987 | Japan . |

Primary Examiner—Richard J. Apley
Assistant Examiner—John P. Leubecker
Attorney, Agent, or Firm—Frishauf, Holtz, Goodman, Langer & Chick

[57] ABSTRACT

An endoscopic apparatus according to the present invention comprises an endoscope insertable in an object of inspection, an apparatus body capable of being removably fixed to the object of inspection, the apparatus body including a fixing section capable of being fixed to the endoscope and a retaining section for holding the fixing section, the retaining section including rotation restraining mechanism for restraining the rotation of the fixing section and a moving mechanism capable of linearly moving the fixing section, a movement detecting section for detecting the movement of the fixing section, a video signal converting section for converting a monitor image of a subject region in the object of inspection, observed by means of the endoscope, into a video signal, and an instrumentation unit including a video signal receiving section for receiving the video signal from the video signal converting section, a storage section for storing video information delivered to the video signal receiving section and detected information delivered from the movement detecting section, and computing means for effecting three-dimensional instrumentation for the subject region in accordance with the video information and the detected information for each position of the endoscope moved together with the fixing section by the moving mechanism.

19 Claims, 8 Drawing Sheets

ENDOSCOPIC APPARATUS FOR THREE DIMENSIONAL INSTRUMENTATION

BACKGROUND OF THE INVENTION

1. Field of the Invention

The present invention relates to an endoscopic apparatus capable of three-dimensional instrumentation for a subject region in an object of inspection.

2. Description of the Related Art

Conventionally, there are various apparatuses which use an endoscope to measure flaws on turbine blades of jet engines and the like.

In an apparatus described in U.S. Pat. No. 4,820,043, for example, an object is measured by means of a graduated transparent screen in an optical system for observation. In an apparatus described in Jpn. Pat. Appln. KOKAI Publication No. 62-161337, on the other hand, the distance from an object is calculated on the basis of the time interval which elapses from the instant that light is projected from the distal end of an endoscope until it is reflected and returned by the object, and three-dimensional instrumentation for the object is carried out in accordance with the calculated distance.

In an apparatus described in U.S. Pat. No. 4,980,763, the size of an object is measured from the position of a shadow in a picture, the shadow being projected on the object of instrumentation. In an apparatus described in U.S. Pat. No. 4,958,932, moreover, means for changing the direction of emission of a convergent illumination light is provided such that the distance between two points on a subject can be measured by aligning a beam spot formed on an object of observation by the illumination light with a mark in the view range.

Described in U.S. Pat. Nos. 4,737,624 and 4,191,468, furthermore, are an optoelectric distance measuring apparatus with an optical measuring probe with shared optics and a range finding fiberscope for measuring the distance of a point in space from a reference plane, respectively. U.S. Pat. Nos. 4,078,864; 4,271,829, etc. are associated with this technique.

However, the prior art apparatuses described above are subject to the following drawbacks.

The apparatus described in U.S. Pat. No. 4,820,043, in which the graduated transparent screen is provided in the optical system for observation, has a drawback that images of the screen cannot be recorded. Since this apparatus cannot record necessary information for instrumentation in advance, moreover, it cannot invoke a recorded image to effect instrumentation for reconfirmation.

The apparatus described in Jpn. Pat. Appln. KOKAI Publication No. 62-161337, cannot detect a short time required for the reciprocation of light if the measured distance is short.

According to the apparatus described in U.S. Pat. No. 4,980,763, a special mechanism must be used to project the shadow on the object of instrumentation, and the length of a reference line as a reference for measurement cannot be changed, so that a measurable distance from the distal end of the endoscope is restricted within a certain range. Thus, if the reference line length is limited, a satisfactory accuracy of measurement can be enjoyed only in an area near the distal end of the endoscope. The apparatus described in U.S. Pat. No. 4,958,932 has the same problem, due to the invariability of the reference line length. Also in an apparatus described in U.S. Pat. No. 4,271,829, its endoscope must be provided with a special mechanism for emitting light beams, and the length of a reference line as a reference for measurement cannot be changed.

According to the apparatus described in U.S. Pat. No. 4,737,624, an instrumentation error is caused by the angle between the object surface and a measuring device, so that instrumentation is limited to those objects which never change their subject surface angles. In the apparatus described in U.S. Pat. No. 4,191,468, the distal end portion of the endoscope must be provided with mirrors, so that an instrumentation head cannot be finished finely. Since the apparatus described in U.S. Pat. No. 4,078,864 is not provided with any means for reproducing instrumentation, it cannot reconfirm instrumentation.

The following is a description of major drawbacks of the aforementioned conventional apparatuses.

(1) Since a special mechanism must be attached to the distal end of the endoscopic apparatus, the apparatus requires use of a special endoscope.

(2) The distal end of the endoscopic apparatus cannot be thinned.

(3) Since the reference line length as a reference for measurement is fixed or cannot be freely changed, a satisfactory accuracy sometimes cannot be enjoyed if the distance from the distal end of the endoscope to the object to be measured varies substantially.

(4) Images and necessary data for instrumentation cannot be recorded for the reconfirmation of instrumentation results.

SUMMARY OF THE INVENTION

The object of the present invention is to provide an endoscopic apparatus for three-dimensional instrumentation capable of eliminating all of the four drawbacks described above.

The above object is achieved by an endoscopic apparatus described below. This endoscopic apparatus comprises: an endoscope insertable in an object of inspection; an apparatus body capable of being removably fixed to the object of inspection, the apparatus body including a fixing section capable of being fixed to the endoscope and a retaining section for holding the fixing section, the retaining section including rotation restraining means for restraining the rotation of the fixing section and moving means capable of linearly moving the fixing section; movement detecting means for detecting the movement of the fixing section; video signal converting means for converting a monitor image of a subject region in the object of inspection, observed by means of the endoscope, into a video signal; and instrumentation means including a video signal receiving section for receiving the video signal from the video signal converting means, storage means for storing video information delivered to the video signal receiving section and detected information delivered from the movement detecting means, and computing means for effecting three-dimensional instrumentation for the subject region in accordance with the video information and the detected information for each position of the endoscope moved together with the fixing section by the moving means.

According to the endoscopic apparatus constructed in this manner, there is no need of any special mechanism at its distal end, so that a conventional endoscope can be used for measurement. Since the distal end of the endoscope has no special mechanism, moreover, the distal end of the endoscopic apparatus can be thinned.

Further, the length of a reference line for the three-dimensional instrumentation can be changed by linearly moving the endoscope together with the fixing section by means of the moving means. Thus, a satisfactory accuracy can be enjoyed even though the distance from the distal end of the endoscope to the object to be measured (subject region) varies substantially.

Since images and necessary data for instrumentation can be recorded in the storage means, furthermore, instrumentation can be repeated at any time by reproducing the images, in order to reconfirm instrumentation results.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will now be described with reference to the accompanying drawings. FIGS. 1 to 8 show a first embodiment of the invention.

Figure 1:
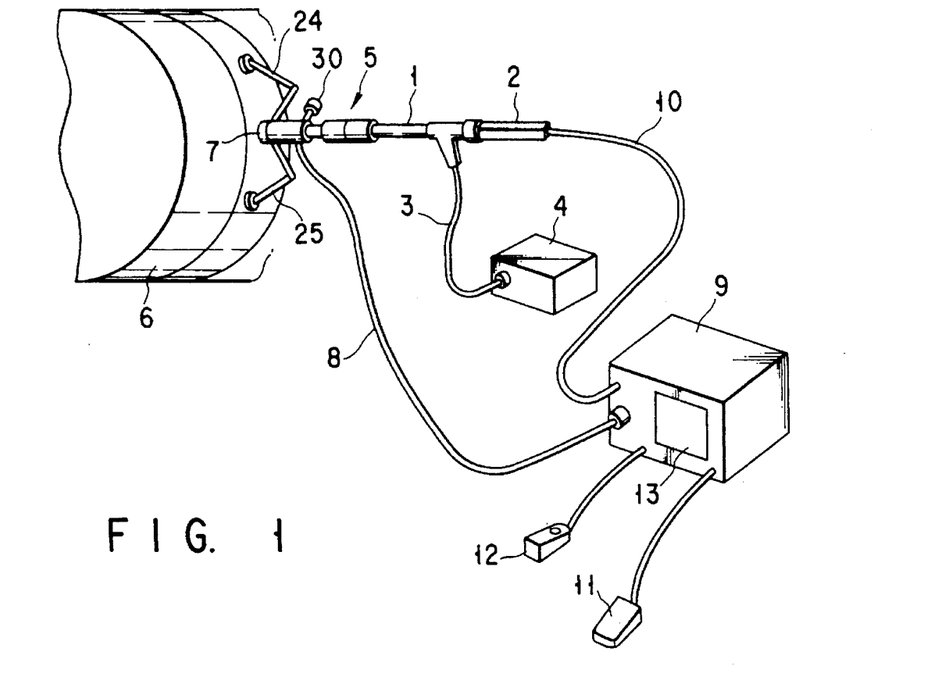
FIG. 1 is a schematic view showing an outline of an endoscopic apparatus according to a first embodiment of the present invention.

FIG. 1 shows an outline of an endoscopic apparatus according to the first embodiment. As shown in FIG. 1, the endoscopic apparatus comprises a lateral-viewing rigid endoscope 1 and an apparatus body 5 which can be removably fixed to a jet engine 6 (object of inspection).

The endoscope 1 is fitted with a TV camera 2 for converting a monitor image of a subject region in the jet engine 6, which is observed by means of the endoscope 1, into a video signal. A light guide (not shown), which extends from the endoscope 1, is passed through a universal cord 3 and connected to a light source unit 4. The endoscope 1 is fixed to an access port 7 of the jet engine 6 by means of the apparatus body 5.

A signal cable 8, which extends from the apparatus body 5, is connected to an instrumentation apparatus 9. The apparatus 9 is connected with a signal cable 10 extending from the TV camera 2, a foot switch 11, and a mouse 12. Also, the apparatus 9 is furnished with a CRT 13 for image observation.

Figure 2:
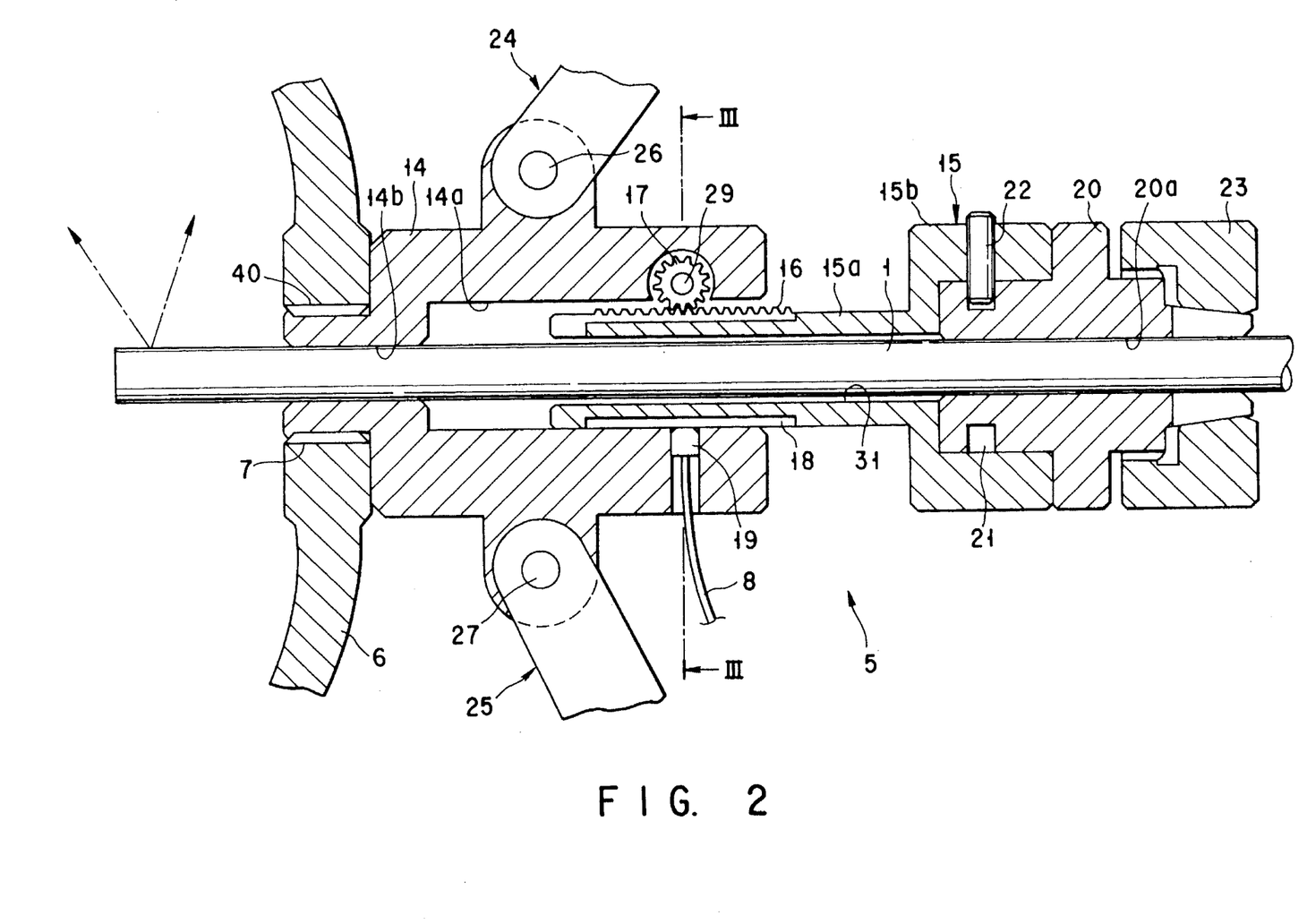
FIG. 2 is a sectional view showing an endoscope and an apparatus body which constitute the endoscopic apparatus of FIG. 1.

Referring now to FIG. 2, the apparatus body 5 will be described in detail.

As shown in FIG. 2, the apparatus body 5 comprises a cylindrical slide member 15 and a retaining section 14, which holds the member 15 and can be mounted on the jet engine 6.

The retaining section 14 includes a fixing screw 40 which mates with the access port 7 of the jet engine 6. The apparatus body 5 can be fixed to the engine 6 by screwing the screw 40 into the port 7. The retaining section 14 has a through hole 14a into which the slide member 15 can be inserted for axial movement.

The slide member 15 is composed of a small-diameter portion 15a on the distal side, which is insertable in the through hole 14a of the retaining section 14, and a large-diameter portion 15b on the proximal side. An axial rack 16 is fixedly embedded in the outer surface of the small-diameter portion 15a. The rack 16 is in mesh with a pinion 17 which is attached to the retaining section 14. Thus, the rack 16 and the pinion 17 constitute moving means for linearly moving the slide member 15 (i.e., fixing member 20 which will be mentioned later).

A scale 18 of a linear encoder is fixed to the small-diameter portion 15a of the slide member 15 so as to extend in the axial direction. A detecting section 19 (movement detecting means) of the linear encoder is fixed to the retaining section 14, corresponding to the range of movement of the scale 18. The signal cable 8, which is connectable to the instrumentation apparatus 9, extends from the detecting section 19 of the encoder.

A cylindrical fixing member 20 is rotatably fitted in the large-diameter portion 15b of the slide member 15. A pin 22, which is fixed to the large-diameter portion 15b, is in engagement with a groove 21 on the peripheral surface of the fixing member 20, whereby the member 20 is prevented from slipping off the slide member 15.

The slide member 15, fixing member 20, and retaining section 14 are provided with endoscope passage holes 31, 20a and 14b, respectively, through which the endoscope 1 can be passed. The proximal side of the fixing member 20 is formed as a collet chuck. Accordingly, the endoscope 1 can be fixed to the member 20 by clamping a fixing ring 23 to the proximal side of the member 20. When the fixing member 20 is rotated with the endoscope 1 fixed thereto, the endoscope 1 rotates together with the member 20. Legs 24 and 25 are rockably mounted on the retaining section 14 by means of pins 26 and 27, respectively.

Figure 3:
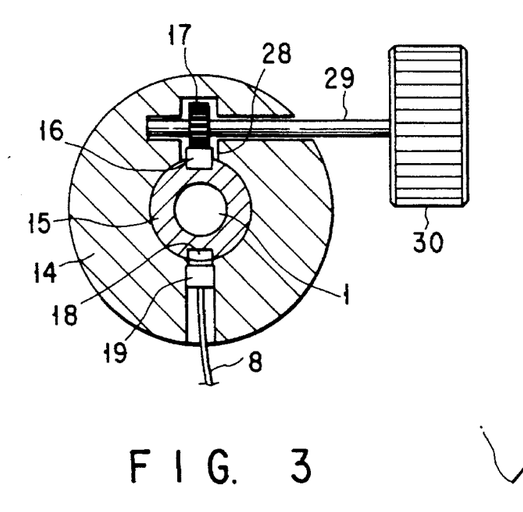
FIG. 3 is a sectional view taken along line III—III of FIG. 2.

Referring now to FIG. 3, a structure for the engagement between the rack 16 and the pinion 17 will be described.

Having its rack 16 fitted in a groove 28 (rotation restraining means) of the retaining section 14, the slide member 15 only slides in the section 14 and never rotates. On the other hand, the pinion 17 is fixed to a pinion shaft 29, which is fixedly fitted with a knob 30. Thus, when the knob 30 is turned, the pinion 17 rotates, so that the rack 16 moves in the axial direction of the retaining section 14.

Figure 4:
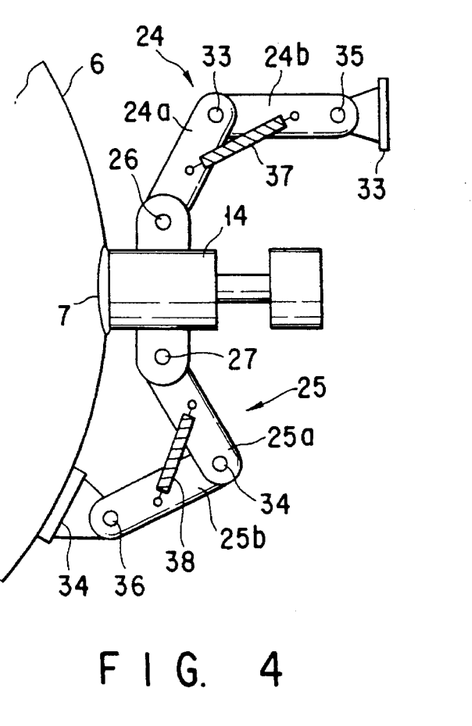
FIG. 4 is a view showing an arrangement of fixing legs attached to the apparatus body.

Referring now to FIG. 4, the construction of the legs 24 and 25 for fixing the retaining section 14 to the jet engine 6 will be described.

Each leg 24 (25) is composed of a first link 24a (25a) rockably mounted on the retaining section 14 by means of a pin 26 (27), a second link 24b (25b) rockably mounted on the distal end of the first link 24a (25a) by means of a link pin 33 (34), and a pad 33 (34) rockably mounted on the distal end of the second link 24b (25b) by means of a pin 35 (36). A spring 37 (38) is stretched between the first and second links 24a (25a) and 24b (25b), and urges the first and second links to approach each other.

Figure 5:
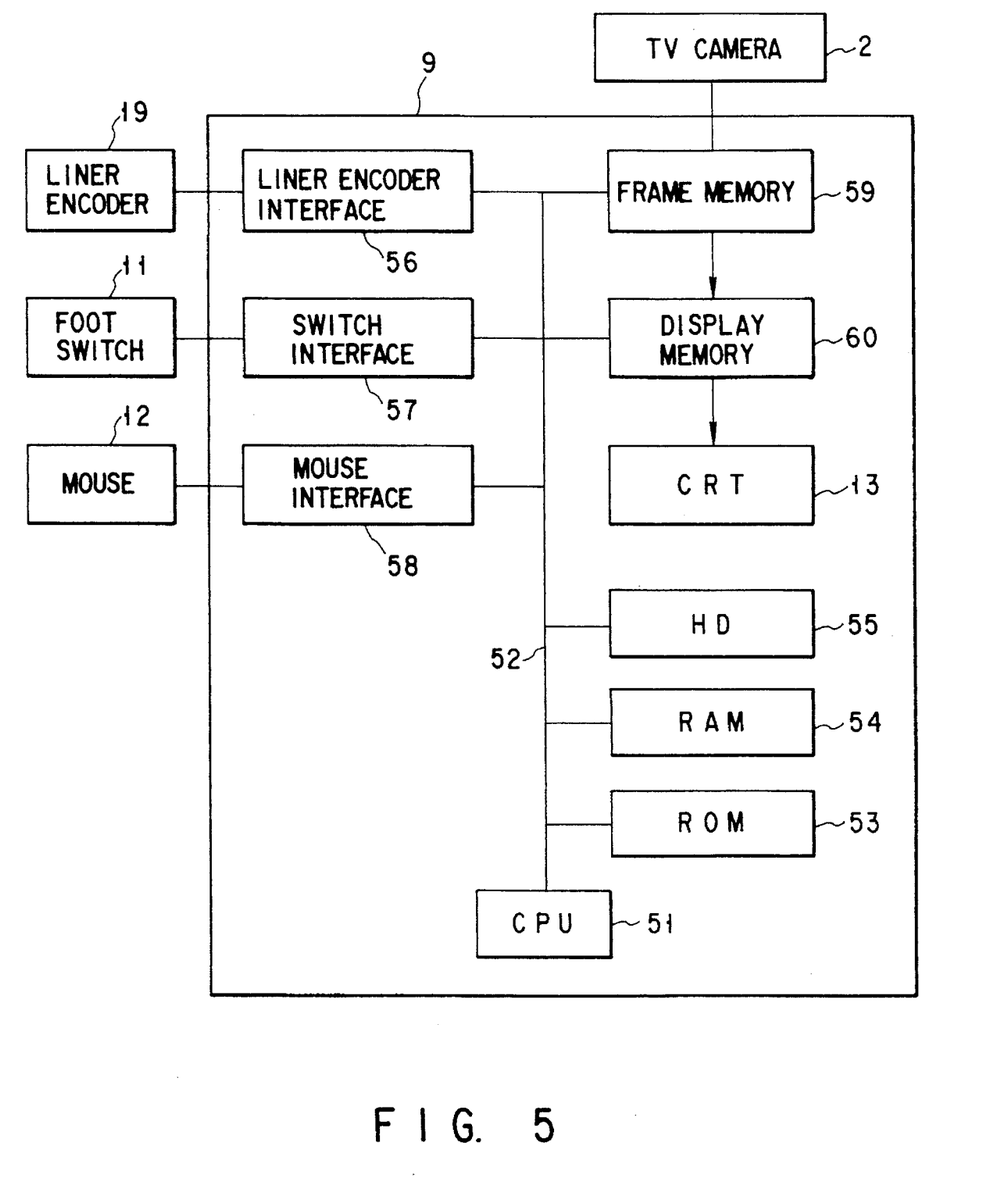
FIG. 5 is a block diagram of an instrumentation apparatus which constitutes the endoscopic apparatus of FIG. 1.

Referring now to FIG. 5, the instrumentation apparatus 9 will be described.

The instrumentation apparatus 9 is provided with a CPU 51 for use as processing means. The CPU 51 is connected with a ROM 53, RAM 54, and HD (hard disk) 55 (storage means) by means of a bus 52. Further, the bus 52 is connected with a linear encoder interface 56, switch interface 57, mouse interface 58, frame memory 59, and display memory 60, which receive signals from the linear encoder 19, foot switch 11, mouse 12, TV camera, and frame memory 59, respectively. The CRT 13 for display is connected to the display memory 60.

The following is a description of the operation of the endoscopic apparatus constructed in this manner.

When using the instrumentation apparatus 9, the apparatuses are connected in the manner shown in FIG. 1. First, the fixing ring 23 on the fixing member 20 of the apparatus body 5 is turned to loosen the collet chuck on the proximal side of the member 20, and the endoscope 1 is inserted into the endoscope passage hole 20a of the member 20. In this state, the endoscope 1 is passed through the respective endoscope passage holes 31 and 14b of the slide member 15 and the retaining section 14. When the distal side of the endoscope 1 is projected from the distal end of the retaining section 14 for a predetermined length such that the subject region can be observed, the fixing ring 23 is turned to tighten the collet chuck, thereby fixing the endoscope 1 to the fixing member 20. In doing this, the TV camera 2 is attached to the endoscope 1 in advance.

The universal cord 3, penetrated by the light guide which extends from the endoscope 1, is connected to the light source unit 4. Further, the signal cables 10 and 8 from the TV camera 2 and the linear encoder 19, the foot switch 11, and the mouse 12 are connected separately to the instrumentation apparatus 9.

Figure 6:
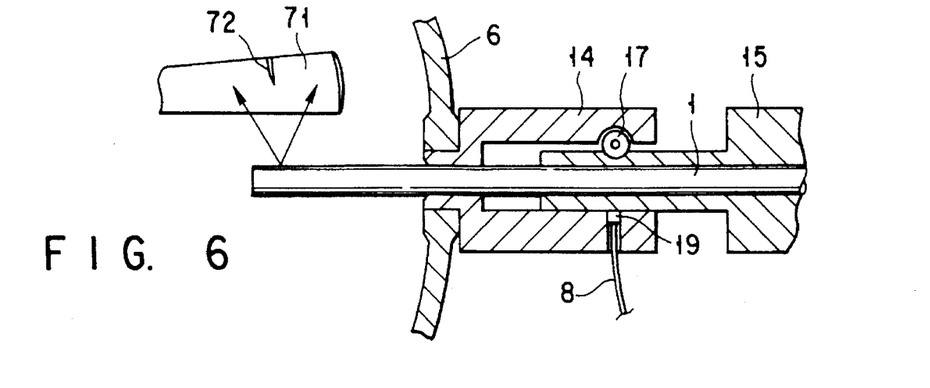
FIG. 6 is a sectional view showing the endoscope set in a first position.

In the set state described above, the fixing screw 40 of the retaining section 14 is fixed to the access port 7 of the jet engine 6 by screwing. Then, the position of the upper and lower legs 24 and 25 are shifted from the state shown in the upper half of FIG. 4 to the one shown in the lower half of FIG. 4. Thereupon, the apparatus body 5 is brought to a state such that the legs 24 and 25 stand firm, as shown in FIG. 1, and is fixed securely to the access port 7 of the engine 6. FIG. 6 shows the interior of the engine 6 in this state.

Figure 7:
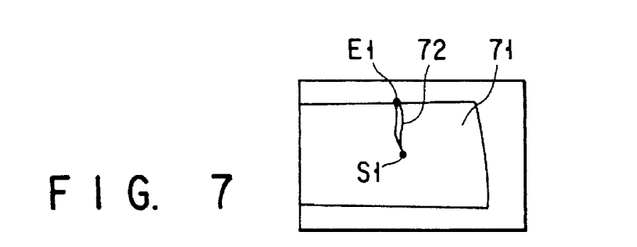
FIG. 7 is an enlarged view of a subject region displayed on a screen in the set position of FIG. 6.

As shown in FIG. 6, the view range of the endoscope 1 is directed to a flaw 72 on a blade 71. At this time, an endoscopic image is displayed on the CRT 13, as shown in FIG. 7, through the medium of the TV camera 2 and the frame memory 59. Then, images in the frame memory 59 are recorded in the HD 55 by operating the foot switch 11. At the same time, a position signal from the linear encoder 19 is fetched into the instrumentation apparatus 9 through the linear encoder interface 56, and is recorded in the HD 55.

Figure 8:
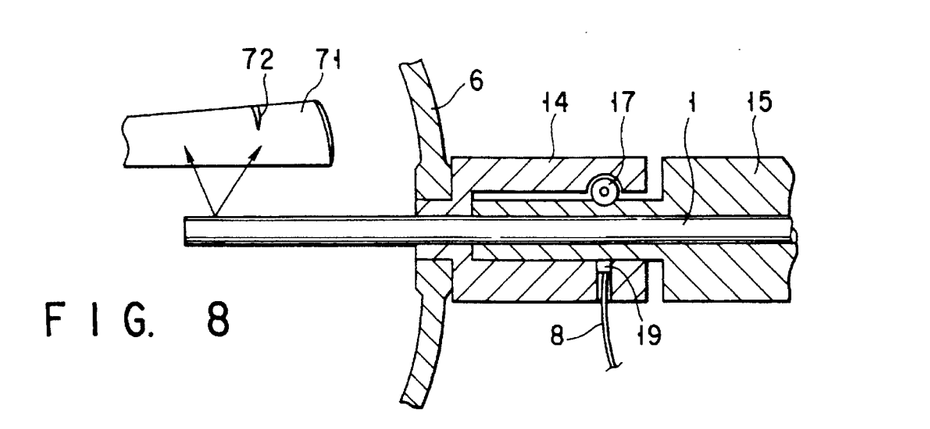
FIG. 8 is a sectional view showing the endoscope set in a second position.
Figure 9:
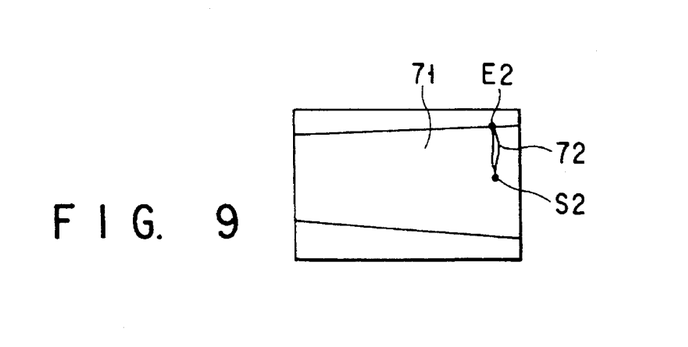
FIG. 9 is an enlarged view of a subject region displayed on the screen in the set position of FIG. 8.

Subsequently, the knob 30 is turned to rotate the pinion 17, so that the slide member 15 is moved in the axial direction, whereupon the endoscope 1 is moved to the position shown in FIG. 8. FIG. 9 shows an endoscopic image obtained at this time. In this state, the foot switch 11 is operated again to record the endoscopic image in the HD 55. At the same time, the position signal from the linear encoder 19 is recorded in the HD 55. If necessary, some other subjects are also recorded.

In starting a measurement after finishing the recording, the initially recorded image (image shown in FIG. 7) is invoked from the HD 55 and displayed on the CRT 13. Then, a point to be measured, e.g., the starting point of the flaw 72, is assigned in a picture on the CRT 13 by means of the mouse 12. This point is designated by S1 in FIG. 7. Then, the end point of the flaw 72 is assigned in like manner by means of the mouse 12. This point is designated by E1 in FIG. 7.

Subsequently, the other image (image shown in FIG. 9) obtained by shifting the endoscope 1 is invoked from the HD 55 and displayed on the CRT 13, and points S2 and E2 corresponding to the points S1 and E1, respectively, on the initial picture are assigned by means of the mouse 12 (see FIG. 9).

The length of the object (flaw 72) in space is calculated on the basis of the two sets of points (S1, E1; S2, E2) assigned in this manner.

Figures 10, 11, 12:
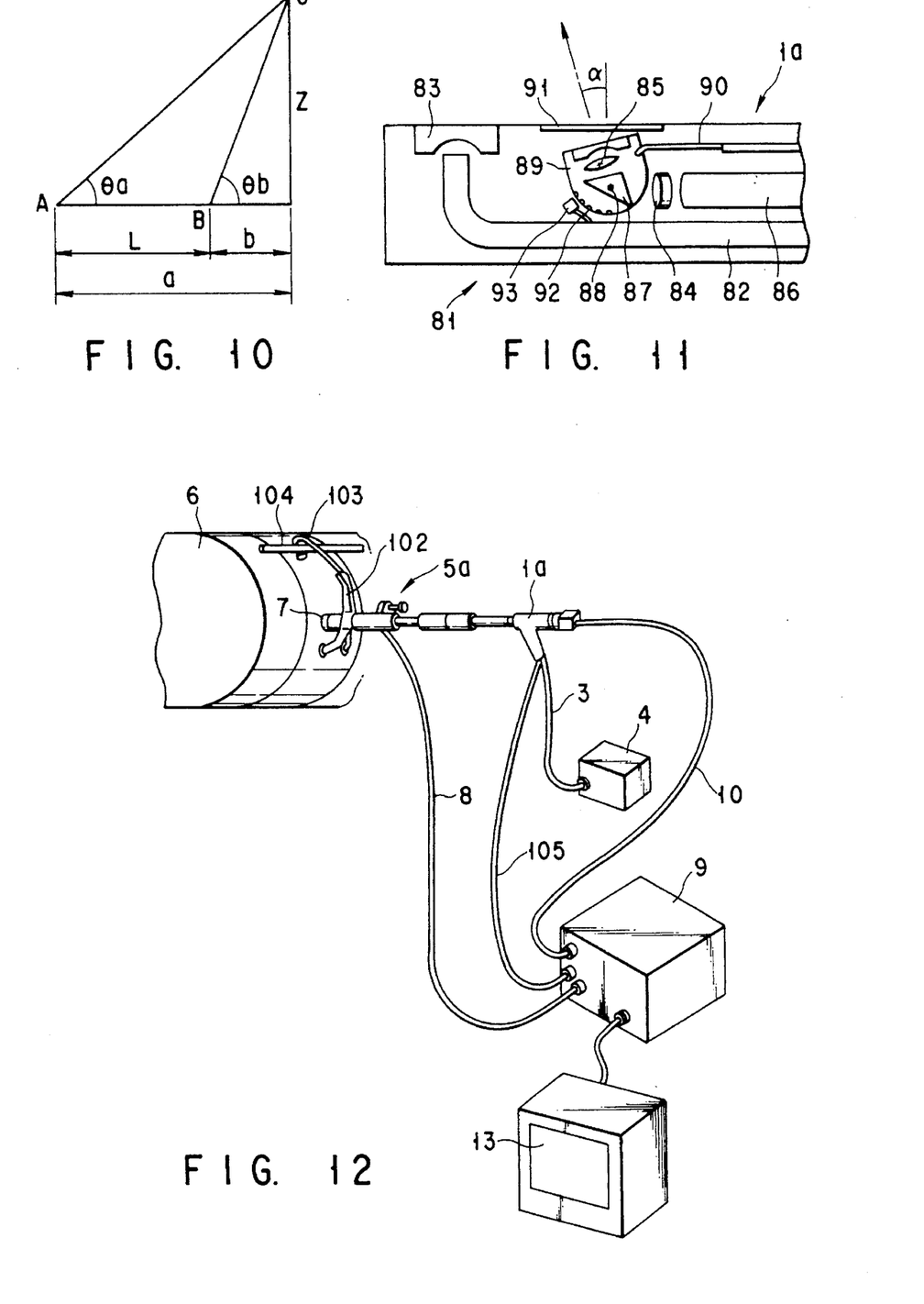
FIG. 10 is a diagram for illustrating the principle of three-dimensional instrumentation using the endoscopic apparatus of FIG. 1.
FIG. 11 is a schematic view showing an arrangement of a distal end portion of an endoscope of an endoscopic apparatus according to a second embodiment of the invention.
FIG. 12 is a schematic view showing an outline of an endoscopic apparatus according to the second embodiment.

FIG. 10 illustrates the principle of instrumentation for the length of the object (flaw 72). Points A and B represent the center of an objective lens of the endoscope 1. Since two points at which the image is fetched are A and B, a parallax as a reference for instrumentation is equivalent to a length L between the points A and B. The length L is obtained by calculating the difference between record values for the linear encoder having so far been recorded in the HD 55.

If the distance from an object point (C ... S1, E1, S2, E2) is Z, we have the following three equations.

$$Z = a \cdot \tan(\theta a),$$

$$Z = b \cdot \tan(\theta b),$$

$$a = L + b.$$

Here θa and θb can be obtained according to the distance from the object point C to the center of the picture and the image formation formula of each lens. Since the parallax L as the reference for measurement is already known, the distance Z from the object point C can be obtained from the aforesaid three equations.

This method of obtaining three-dimensional coordinates for the object point C is described in, for example, Jpn. Pat. Appln. No. 2-28108 (Jpn. Pat. Appln. KOKAI Publication No. 3-231622), Jpn. Pat. Appln. No. 5-171786 (Jpn. Pat. Appln. KOKAI Publication No. 7-27519), Jpn. Pat. Appln. No. 6-22579 (Jpn. Pat. No. P371979).

Since three-dimensional coordinates for the points S (S1, S2) and E (E1, E2) can be obtained in this manner, the lengths of segments which connect the points S and E in space can be determined. In other words, the length of the flaw 72 on the blade 71 can be measured.

Since the endoscopic apparatus according to the present embodiment does not require use of any special mechanism at the distal end of the endoscope, as described above, a conventional endoscope can be used for the measurement, and the distal side of the endoscopic apparatus can be reduced in diameter.

In the endoscopic apparatus of the present embodiment, moreover, the reference length L for measurement can be changed by varying the angle of turn of the knob 30. Even though the distance from the distal end of the endoscope 1 to the object to be measured varies substantially, therefore, a satisfactory accuracy of measurement can be enjoyed.

Since the endoscopic apparatus of the present embodiment can record and reproduce images and necessary data for instrumentation, furthermore, instrumentation can be repeated at any time by reproducing the images, in order to reconfirm instrumentation results.

FIGS. 11 to 14 show a second embodiment of the present invention. In the first embodiment, the endoscope used is the lateral-viewing rigid endoscope 1. According to the second embodiment, however, a variable-view rigid endoscope 1a is used such that the viewing direction can be changed.

FIG. 11 shows an arrangement of a distal end portion 81 of the endoscope 1a. The distal end portion 81 is provided with a light guide 82. The distal end portion of the light guide 82 is bent so that its end face is opposed to an illumination lens 83. Objective lens means is composed of a fixed objective lens 84 and a rotatable objective lens 85. A relay lens 86 is located behind the fixed lens 84. The relay lens 86 can guide an image formed by means of the objective lens means to an eyepiece (not shown).

A prism 87 is disposed between the fixed and rotatable objective lenses 84 and 87. The prism 87 can change the viewing direction by reflecting light. The rotatable objective lens 85 and the prism 87 are incorporated in a rotator 89 which has a shaft 88. An operating wire 90 is connected to the rotator 89. The rotator 89 can be rotated around the shaft 88 by pushing or pulling the wire 90.

A glass cover 91 is located in front of the rotator 89. The rotator 89 is provided with a scale 92 of a rotary encoder. A detecting section 93 of the rotary encoder, which is attached to the distal end portion 81, detects the rotational angle of the rotator 89 with reference to the scale 92 on the rotator 89.

FIG. 12 shows an outline of an endoscopic apparatus according to the present embodiment. As shown in FIG. 12, an apparatus body 5a is provided with three fixed legs 102. The distal end portion of one of these legs 102 constitutes a hook portion 103. The hook portion 103 can be caught by a pipe 104 or some other accessory of the jet engine 6. The length of the hook portion 103 is adjustable.

A signal line 105 which extends from the rotary encoder 93 of the endoscope 1a is connected to an instrumentation apparatus 9. In the present embodiment, the instrumentation apparatus 9 and a CRT 13 are arranged separately. An interface (not shown) which receives a signal from the rotary encoder 93 is incorporated in the instrumentation apparatus 9, as in the case of the linear encoder 19.

Figure 13:
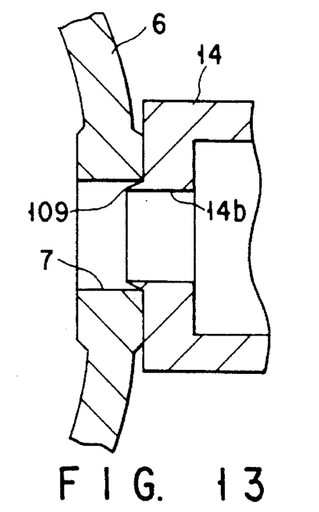
FIG. 13 is a sectional view of a fixing section of the endoscopic apparatus of FIG. 12.

As shown in FIG. 13, a retaining section 14 of the apparatus body 5a of the endoscopic apparatus of the present embodiment, unlike the one according to the first embodiment, is not fixed to an access port 7 by screwing, but is fixed in a manner such that its taper portion 109 is anchored to the access port 7.

Figure 14:
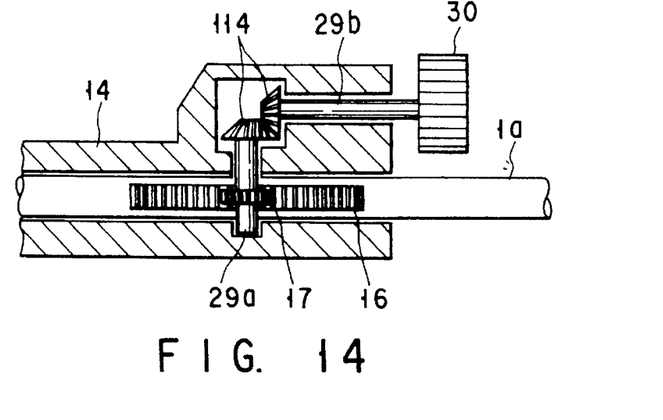
FIG. 14 is a sectional view of a rack portion of the endoscopic apparatus of FIG. 12.

FIG. 14 shows an axial profile of the retaining section 14 according to the present embodiment. As shown in FIG. 14, a bevel gear 114 is interposed between a shaft 29b of a knob 30 for linearly moving the endoscope 1a and a shaft 29a of a pinion 17, so that the shaft 29b of the knob 30 extends in the same direction as the central axis of the endoscope 1a. Other elements of the second embodiment are arranged in the same manner as their counterparts of the first embodiment.

The following is a description of the operation of the endoscopic apparatus according to the present embodiment. First, the hook portion 103 of the leg 102, which is attached to the apparatus body 5a, is anchored to the suitable pipe 104 of the jet engine 6. Thereafter, the length of the hook portion 103 is adjusted to set the apparatus body 5a in an appropriate posture.

The present embodiment differs from the first embodiment in that the signal from the rotary encoder 93 is also fetched into the instrumentation apparatus 9. In calculating the distance, therefore, changes of angle obtained from the encoder 93 are taken into consideration.

Although the reference line length for measurement is L according to the first embodiment, a reference line length L' for measurement according to the present embodiment is given by $L' = L \cdot \cos(\alpha)$, where $\alpha$ is the angle of inclination of the viewing direction to a normal line. Thus, instrumentation is carried out on the basis of this reference line length L' in the same manner as in the first embodiment.

As described above, the endoscopic apparatus of the present embodiment can provide the same function and effect as the first embodiment, and is designed so that the apparatus body 5a can be fixed without utilizing a screw portion of a mounting hole of the access port 7. Accordingly, the inside diameter of that part of the retaining section 14 which is attached to the mounting hole of the access port 7 (or the diameter of an endoscope passage hole 14b) can be increased. Thus, the endoscope used in the present embodiment can be made thicker than the one used in the first embodiment.

Since the knob 30 for moving the endoscope need not be provided on the flank of the apparatus, moreover, it requires a smaller space, and can be operated more easily. Furthermore, the use of the variable-view endoscope 1a makes the observation of the subject region easier than in the first embodiment.

In the present embodiment, the rocking angle of the prism 87 at the distal end portion 81 of the endoscope 1a (or the rotational angle of the rotator 89) is detected by means of the encoder 93. Alternatively, however, means for detecting the movement of the wire 90 may be provided so that the rocking angle of the prism 87 or the rotational angle of the rotator 89 can be obtained from the detected wire movement. In this case, the detecting means is located at the distal end portion of the endoscope 1a or a control section at the proximal side of the endoscope 1a, especially in the vicinity of various control levers which are attached to the control section.

Variable-view endoscopes are described in Jpn. UM Appln. KOKOKU Publication Nos. 30-8794, 47-30235, 51-43665 and 52-1758, Jpn. UM Appln. KOKAI Publication NO. 49-32484, Jpn. Pat. Appln. KOKOKU Publication No. 55-38134, U.S. Pat. Nos. 4,697,557; 3,856,000 and 3,262,364, German Patent Application No. 1,244,440, etc. In these endoscopes, the reference line length, as a reference for measurement, varies when the viewing direction is changed, so that it is necessary to detect the degree of change of the viewing direction. As in the case of the second embodiment, therefore, the rotary encoder 93 for use as viewing direction detecting means must be provided to detect the viewing direction.

According to a third embodiment of the present invention described below, however, there is provided an endoscopic apparatus in which the change of the viewing direction can be reflected appropriately in instrumentation without using any means for detecting the viewing direction.

Figure 15:
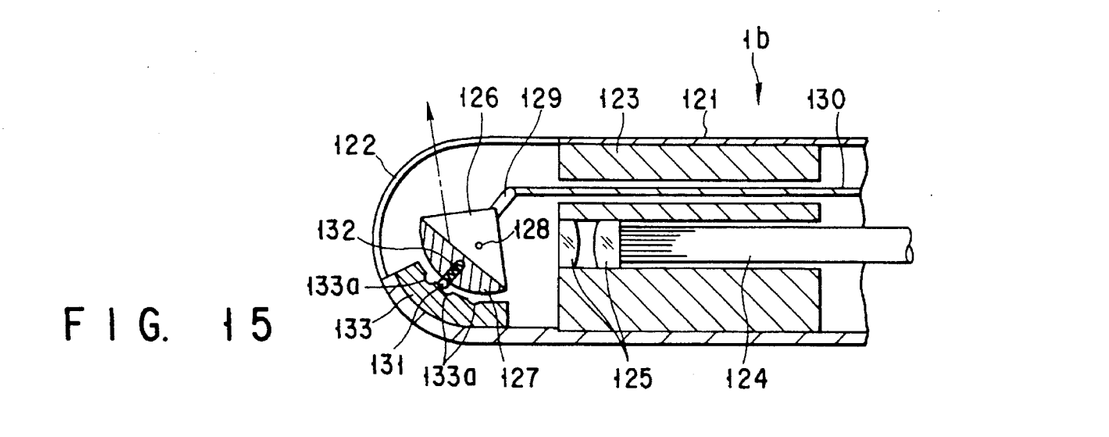
FIG. 15 is a sectional view of a distal end portion of an endoscope which constitutes an endoscopic apparatus according to a third embodiment of the invention.
Figure 16:
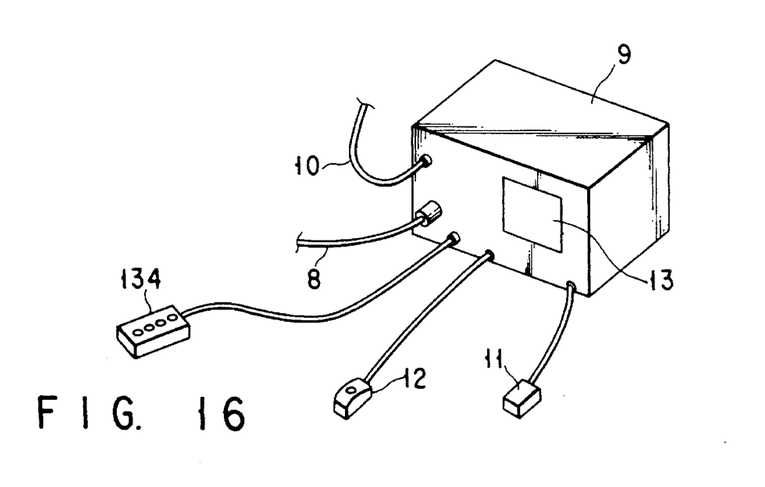
FIG. 16 is a schematic view showing an instrumentation apparatus and its surroundings which constitute the endoscopic apparatus according to the third embodiment.
Figure 17:
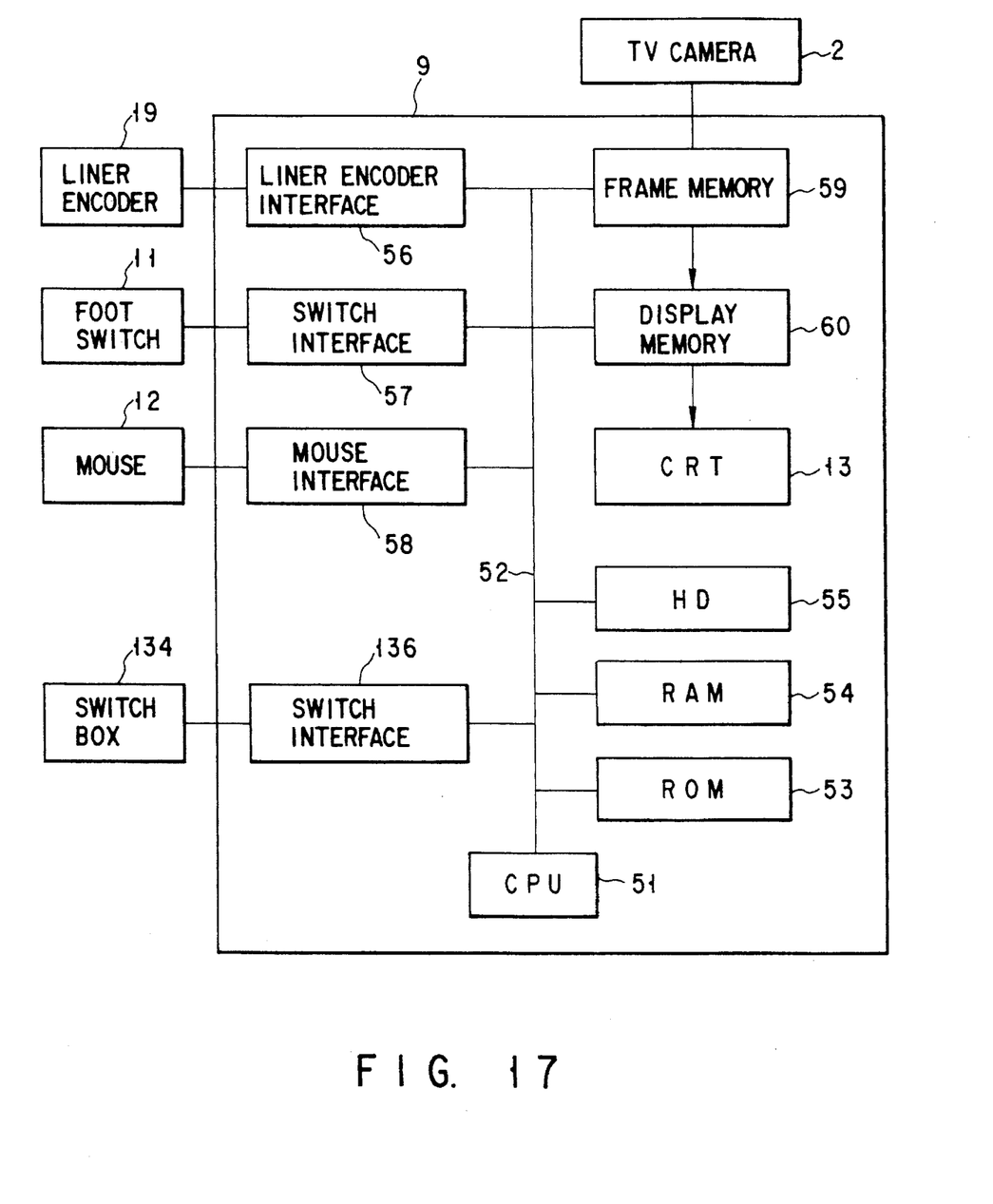
FIG. 17 is a block diagram of the instrumentation apparatus which constitutes the endoscopic apparatus according to the third embodiment.

FIGS. 15 to 17 show the third embodiment. The endoscopic apparatus according to the third embodiment, like the one according to the second embodiment, comprises a variable-view endoscope 1b. The third embodiment, however, differs from the second embodiment in that the rotary encoder 93 for detecting the viewing direction is omitted.

FIG. 15 shows a profile of a distal end portion 121 of the endoscope 1b. As shown in FIG. 15, the distal end portion 121 is fitted with a transparent cover 122. An image guide 124 and objective lenses 125 are arranged in a distal end body 123 which constitutes the distal end portion 121.

In front of the objective lenses 125, a prism 126 is held on a rotating block 127. The rotating block 127 can rotate around a shaft 128 which is fixed to the distal end portion 121. The block 127 is provided with a fixing section 129 which is connected with an operating wire 130. A compression spring 132 is disposed in a hole bored in the base of the rotating block 127, and a ball 131 is attached to the spring 132. The ball 131 is urged outward by the spring 132, so that it is continually pressed against a ball receiving member 133 which is attached to that region of the distal end portion 121 which faces the rotating block 127. Also, the outer surface of the member 133 is formed with a plurality of grooves 133a (three in number as illustrated) which can engage the ball 131.

As shown in FIG. 16, a switch box 134 is connected to an instrumentation apparatus 9. The switch box 134 has four switches, and can deliver four types of signals to the apparatus 9. As shown in FIG. 17, the instrumentation apparatus 9 is constructed in the same manner as the one according to the first embodiment except that it is furnished with an interface 136 for receiving the signal from the switch box 134.

The following is a description of the operation of the endoscopic apparatus constructed in this manner.

If the operating wire 130 is pushed or pulled by rocking a handle (not shown) which is attached to a control section on the proximal side of the endoscope 1b, for example, the rotating block 127 rotates around the shaft 128, whereupon the viewing direction of the endoscope 1b changes. When the rotating block 127 rotates around the shaft 128 so that the ball 131 falls into one of the grooves 133a of the ball receiving member 133, it is fixed in position. When the operating wire 130 is operated resisting the drag of the compression spring 132, the rotating block 127 further rotates so that the ball 131 falls into another groove 133a. Thus, the rotating block 127 can be fixed only in those positions where the ball 131 can engage the grooves 133a, and the rotational angle of the prism 126 is set at predetermined intervals. In FIG. 15, the rotational angle of the prism 126 is set in three positions.

According to the endoscopic apparatus of the present embodiment, as described above, the prism 126 for viewing direction change can be set at predetermined rotational angles by causing the ball 131 to engage the grooves 133a, so that the viewing direction of the endoscope 1b can be easily detected without the use of a rotary encoder. In this case, three-dimensional instrumentation can be repeated at any time by only recording the viewing direction of the endoscope 1b or the rotational angle of the prism 126 in advance in the instrumentation apparatus 9, by depressing one of the switches of the switch box 134 during operation for image recording in the HD 55.

In the embodiment described above, click stop means including the ball 131 is used as means for setting the rotational angle of the prism 126 (or rotating block 127) in the predetermined positions. Besides this, some other arrangements may be used for the purpose, including click stop means using magnets, a combination of a projection on a leaf spring and click holes, click stop means on the side of the operating wire 130, etc.

Figure 18:
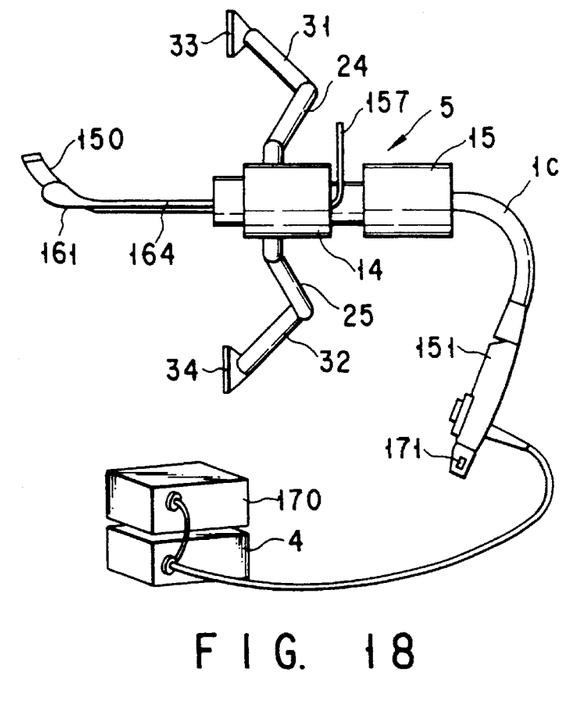
FIG. 18 is a schematic view showing an endoscopic apparatus having retaining means for holding the distal end portion of the endoscope.
Figure 19:
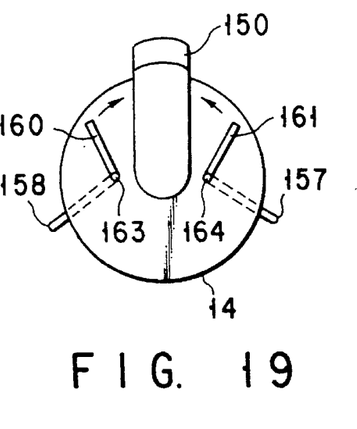
FIG. 19 is a front view of an apparatus body shown in FIG. 18.

FIGS. 18 and 19 show an example in which a retaining section 14 is provided with a fixing member for fixing an endoscope. As shown in FIG. 18, a video endoscope 1c furnished with a CCD is inserted and fixed in an apparatus body 5b. The endoscope 1c and the apparatus body 5b are arranged in the same manner as their counterparts of the first embodiment. Two control shafts 163 and 164 (of which only the shaft 164 is illustrated) are rotatably passed through the retaining section 14. The shafts 163 and 164 are arranged substantially bisymmetrically with respect to the central axis of the retaining section 14 (see FIG. 19). Extending parallel to the endoscope 1c, the shafts 163 and 164 are passed through the retaining section 14 so that their respective distal end portions project from the distal end of the section 14. Backup blades 160 (nipping members) and 161 are fixed to the distal ends of the control shafts 163 and 164, respectively, which project from the distal end of the retaining section 14. The proximal portions of the shafts 163 and 164 are bent at about 90° and form control levers 157 and 158, respectively.

A control section 151 of the endoscope 1c is provided with a control button 171. An instrumentation apparatus (not shown) can be actuated by operating the button 171. Thus, the control button 171 has the same function as the foot switch 11 according to the first embodiment.

The endoscope 1c, like conventional endoscopes, is connected to a light source unit 4 and a camera control unit 170. The respective outputs of these units are connected to the instrumentation apparatus 9.

According to this arrangement, a distal end portion 150 of the endoscope 1c can be fixed by rotating the control levers 157 and 158 to rock the backup blades 160 and 161 in the directions of the arrows in FIG. 19 so that the distal end portion 150 is held between the blades 160 and 161. By doing this, the distal end portion 150 of the endoscope 1c can be prevented from moving unexpectedly and lowering the accuracy of measurement.

Figure 20:
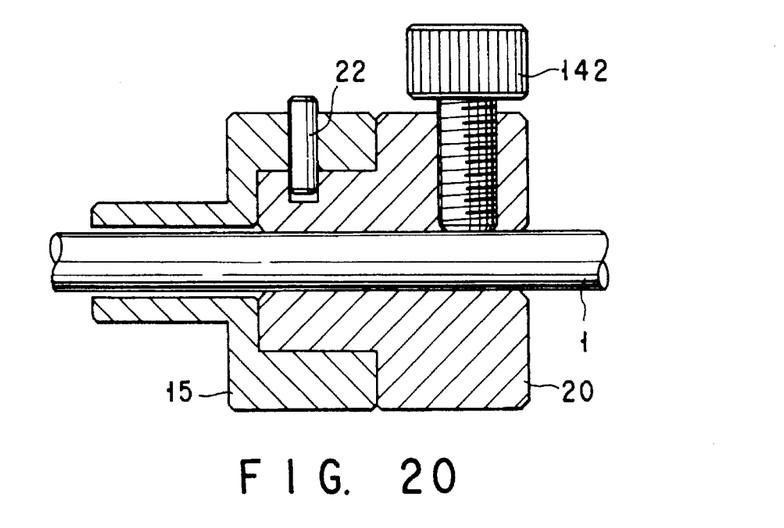
FIG. 20 is a sectional view showing a modification of fixing means between the body and the endoscope of the endoscopic apparatus.

Although the collet chuck is used to fix the endoscope in each of the embodiments described above, the endoscope may be fixed by clamping by means of a screw. FIG. 20 shows this arrangement. As shown in FIG. 20, the endoscope 1 is fixed to the fixing member 20 by screwing a fixing screw 142 into the member 20 so that the distal end of the screw 142 abuts against the outer peripheral surface of the endoscope 1.

Although a rigid endoscope is used as the endoscope according to each of the above-described embodiments, it may be replaced with a flexible endoscope, fiberscope, video endoscope furnished with a CCD, etc.

Although the linear encoder is used as the means for detecting the movement of the endoscope according to each of the above-described embodiments, moreover, it may be replaced with a rotary encoder for detecting the rotation of a pinion.

In each of the aforementioned embodiments, furthermore, the slide member 15 is designed so as to be able to stop at any desired position. Alternatively, however, the slide member 15 may be provided with a click stop mechanism, which is similar to the click stop means according to the third embodiment, so that the member 15 can stop with a click at a plurality of specified positions. In this case, the switch box is designed so that it can supply the instrumentation apparatus 9 with the position of the stopped slide member 15. Alternatively, a mouse, keyboard, etc. may be used to set the position of the slide member 15 in a picture.

According to the first embodiment, moreover, the foot switch is used as a switch for storing images. Alternatively, however, images may be stored by depressing a push-button switch which is attached to the endoscope.

Although the mouse is used to indicate the position of the flaw 72 in the picture, moreover, it may be replaced with keys of a keyboard, light pen, touch panel, track ball, etc. Instead of displaying images one by one, furthermore, only necessary portions of each two images may be simultaneously displayed side by side.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An endoscopic apparatus comprising:

an endoscope insertable in an object of inspection;

an apparatus body capable of being removably fixed to the object of inspection, the apparatus body including a fixing section capable of being fixed to the endoscope and a retaining section for holding the fixing section, the retaining section including rotation restraining means for restraining the rotation of the fixing section and moving means capable of linearly moving the fixing section;

movement detecting means for detecting the movement of the fixing section;

video signal converting means for converting a monitor image of a subject region in the object of inspection, observed by means of the endoscope, into a video signal; and instrumentation means including a video signal receiving section for receiving the video signal from the video signal converting means, storage means for storing video information delivered to the video signal receiving section and detected information delivered from the movement detecting means, and computing means for effecting three-dimensional instrumentation for the subject region in accordance with the video information and the detected information for each position of the endoscope moved together with the fixing section by the moving means.

2. An endoscopic apparatus according to claim 1, wherein said fixing section includes a slide member held by means of the retaining section and adapted to be linearly moved by the moving means, and a rotator having connecting means rotatably mounted on the slide member and connected to the endoscope.

3. An endoscopic apparatus according to claim 2, wherein said connecting means comprises a collet chuck.

4. An endoscopic apparatus according to claim 2, wherein said connecting means comprises a screw member pressed against the outer peripheral surface of the endoscope.

5. An endoscopic apparatus according to claim 1, wherein said fixing section includes a rack, and said moving means of said retaining section includes a pinion in mesh with the rack and rotating means for rotating the pinion.

6. An endoscopic apparatus according to claim 1, wherein said fixing section includes a projection, and said rotation restraining means comprises a recess formed in the retaining section and adapted to engage the projection of the fixing section.

7. An endoscopic apparatus according to claim 1, wherein said movement detecting means includes a scale attached to the fixing section and a detecting section for reading the scale.

8. An endoscopic apparatus according to claim 1, wherein said apparatus body has a through hole through which the endoscope can be passed.

9. An endoscopic apparatus according to claim 1, further comprising viewing direction changing means provided in an objective optical system of the endoscope and used to change the viewing direction of the endoscope.

10. An endoscopic apparatus according to claim 9, wherein said viewing direction changing means includes a prism for changing the viewing direction by reflecting light, a rotating member for holding the prism, and an operating wire for operating the rotating member for rotation.

11. An endoscopic apparatus according to claim 10, further comprising viewing direction detecting means for detecting the viewing direction of the endoscope.

12. An endoscopic apparatus according to claim 11, wherein said viewing direction detecting means includes a detecting section for detecting the rotational angle of the rotating member.

13. An endoscopic apparatus according to claim 11, wherein said viewing direction detecting means includes retaining means for holding the rotating member in a plurality positions corresponding to predetermined rotational angles and input means for applying the rotational angle of the position in which the rotating member is held to the instrumentation means.

14. An endoscopic apparatus according to claim 13, wherein said retaining means includes an engaging member attached to the rotating member, a retainer opposed to the rotating member, and a plurality of grooves formed on the outer surface of the retainer and capable of engaging the engaging member.

15. An endoscopic apparatus according to claim 1, wherein said retaining section comprises a male screw such that the apparatus body is capable of being fixed to the object of inspection by screwing the male screw into a female screw formed on the inner peripheral surface of a mounting hole of the object of inspection.

16. An endoscopic apparatus according to claim 1, wherein said retaining section comprises an engaging portion at the distal end thereof such that the apparatus body is capable of being fixed to the object of inspection by anchoring the engaging portion to the end edge of a mounting hole of the object of inspection.

17. An endoscopic apparatus according to claim 1, wherein said endoscope is comprises a lateral-viewing rigid endoscope.

18. An endoscopic apparatus according to claim 1, wherein said endoscope is comprises a flexible endoscope.

19. An endoscopic apparatus according to claim 1, further comprising a pair of nipping members attached to the apparatus body and used to nip the distal end of the endoscope, thereby fixing the viewing direction of the endoscope.

* * * * *